United States Patent
Xie et al.

(10) Patent No.: US 11,642,786 B2
(45) Date of Patent: May 9, 2023

(54) HUMANOID ROBOT AND ITS BALANCE CONTROL METHOD AND COMPUTER READABLE STORAGE MEDIUM

(71) Applicant: UBTECH ROBOTICS CORP LTD, Shenzhen (CN)

(72) Inventors: Yan Xie, Shenzhen (CN); Mingguo Zhao, Shenzhen (CN); Youjun Xiong, Shenzhen (CN)

(73) Assignee: UBTECH ROBOTICS CORP LTD, Shenzhen (CN)

(*) Notice: Subject to any disclaimer, the term of this patent is extended or adjusted under 35 U.S.C. 154(b) by 284 days.

(21) Appl. No.: 17/138,948

(22) Filed: Dec. 31, 2020

(65) Prior Publication Data
US 2022/0040857 A1 Feb. 10, 2022

(30) Foreign Application Priority Data
Aug. 6, 2020 (CN) .......................... 202010781984.7

(51) Int. Cl.
*B25J 9/16* (2006.01)
*B62D 57/02* (2006.01)
(Continued)

(52) U.S. Cl.
CPC ........... *B25J 9/1664* (2013.01); *B25J 9/1651* (2013.01); *B25J 9/1653* (2013.01); *B25J 9/0006* (2013.01);
(Continued)

(58) Field of Classification Search
CPC ...... B25J 9/1664; B25J 9/1651; B25J 9/1653; B25J 9/0006; B25J 9/1607; B25J 19/0008;
(Continued)

(56) References Cited

U.S. PATENT DOCUMENTS 8,825,213 B2 * 9/2014 Kanazawa ........... B62D 57/032
700/263
11,529,247 B2 * 12/2022 Casler, Jr. ................ H02K 7/06
(Continued)

FOREIGN PATENT DOCUMENTS

JP 2016112656 A * 6/2016

OTHER PUBLICATIONS

Luo, R. C, et al., "Effective Online Trajectory Generation of Waist and Arm for Enhancing Humanoid Robot Walking," Jun. 2016, IEEE 25th International Symposium on Industrial Electronics, pp. 369-374 (Year: 2016).*

Vuga R., et al., "Motion Capture and Reinforcement Learning of Dynamically Stable Humanoid Movement Primitives," May 2013, IEEE International Conference on Robotics and Automation, pp. 5284-5290 (Year: 2013).*

*Primary Examiner* — Abby Y Lin
*Assistant Examiner* — Karston G. Evans

(57) ABSTRACT

A humanoid robot and its balance control method and computer readable storage medium are provided. Expected accelerations of each of a sole and centroid of a humanoid robot corresponding to a current expected balance trajectory and an expected angular acceleration of the waist corresponding to the current expected balance trajectory are obtained based on current motion data of the sole, the centroid, and the waist, respectively first, then an expected angular acceleration of each joint meeting control requirements of the sole, the centroid, and the waist while the robot corresponds to the current expected balance trajectory is calculated based on an angular velocity of the joint, the expected accelerations of the waist, the sole, and the centroid, respectively, and then each joint of the robot is controlled to move at the obtained expected angular acceleration of the joint based on the angular displacement of the joint.

20 Claims, 9 Drawing Sheets

(51) Int. Cl.
*B62D 57/032* (2006.01)
*B25J 19/00* (2006.01)
*B25J 9/00* (2006.01)

(52) U.S. Cl.
CPC .......... *B25J 9/1607* (2013.01); *B25J 19/0008* (2013.01); *B62D 57/02* (2013.01); *B62D 57/032* (2013.01); *G05B 2219/39063* (2013.01); *G05D 2201/0217* (2013.01)

(58) Field of Classification Search
CPC ........ B25J 9/1612; B25J 9/161; B25J 9/1661; B62D 57/02; B62D 57/032; B62D 37/04; G05B 2219/39063; G05D 2201/0217
See application file for complete search history.

(56) References Cited

U.S. PATENT DOCUMENTS

| | | | | |
|---|---|---|---|---|
| 2003/0220714 | A1* | 11/2003 | Nakamura | G06T 13/40 700/69 |
| 2007/0083290 | A1* | 4/2007 | Nagasaka | B25J 9/1671 318/568.11 |
| 2010/0250001 | A1* | 9/2010 | Hodgins | G05B 11/32 700/245 |
| 2011/0160907 | A1* | 6/2011 | Orita | B25J 9/1607 700/260 |
| 2015/0051734 | A1* | 2/2015 | Zheng | B25J 9/1633 901/1 |
| 2021/0178588 | A1* | 6/2021 | Chen | B25J 13/088 |

\* cited by examiner

```
┌─────────────────────────────────────────────────────────────────────┐
│ For each balance control part corresponding to the sole and the     │
│ centroid, subtract the reference pose and the motion pose of the    │──S221
│ balance control part and subtracting the reference speed and the    │
│ motion speed of the balance control part to obtain a corresponding  │
│ pose difference and speed difference                                │
└─────────────────────────────────────────────────────────────────────┘
                                  ↓
┌─────────────────────────────────────────────────────────────────────┐
│ Select a difference parameter matching a preset control function    │──S222
│ corresponding to the balance control part from the obtained pose    │
│ difference and speed difference                                     │
└─────────────────────────────────────────────────────────────────────┘
                                  ↓
┌─────────────────────────────────────────────────────────────────────┐
│ Substitute the reference acceleration of the balance control part   │──S223
│ and the selected difference parameter into the corresponding preset │
│ control function to obtain the expected acceleration of the balance │
│ control part                                                        │
└─────────────────────────────────────────────────────────────────────┘
```

FIG. 3

| Subtract the reference posture angle and the motion posture angle of the waist and subtracting the reference angular velocity and the motion angular velocity of the waist to obtain a corresponding posture angle difference and angular velocity difference | ⟵ S225 |

| Select a difference angle parameter matching a preset control function corresponding to the waist from the posture angle difference and the angular velocity difference | ⟵ S226 |

| Substitute the reference angular acceleration of the waist and the selected difference angle parameter into the corresponding preset control function to obtain the expected angular acceleration of the waist | ⟵ S227 |

FIG. 4

HUMANOID ROBOT AND ITS BALANCE CONTROL METHOD AND COMPUTER READABLE STORAGE MEDIUM

CROSS REFERENCE TO RELATED APPLICATIONS

The present disclosure claims priority to Chinese Patent Application No. 202010781984.7, filed Aug. 6, 2020, which is hereby incorporated by reference herein as if set forth in its entirety.

BACKGROUND

1. Technical Field

The present disclosure relates to robot control technology, and particularly to a humanoid robot and its balance control method and computer readable storage medium.

2. Description of Related Art

With the continuous development of science and technology, robotic technology has received extensive attentions from a various of industries because of its great research value and application value. In which, humanoid robot is an important research branch of the existing robotic technology. For a humanoid robot, the prerequisite for the humanoid robot to achieve own walking and operating capabilities is that they can maintain balance in a complex usage environment. Hence, the capability of the balance control of the humanoid robot is a key issue that will restrict the humanoid robot from becoming practical. A current balance control scheme is to divide an entire balance control task into a plurality of control subtasks (e.g., ground force control, momentum control, and whole body dynamics control) according to the structure of the robot system, and then each control subtask is controlled individually to perform the balance control of the robot by effecting the entirety through part. However, in this scheme, due to the coupling between a plurality of control subtasks, the control subtasks will often interfere with each other, which increases the complexity of the robot system. The effect of other control subtasks will usually be affected while only the effect of a certain control subtask will be improved.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

FIG. 3 is a flow chart of example one of sub-steps in step S220 of the method of FIG. 2.

FIG. 4 is a flow chart of example two of sub-steps in step S220 of the method of FIG. 2.

DETAILED DESCRIPTION

Figure 1:
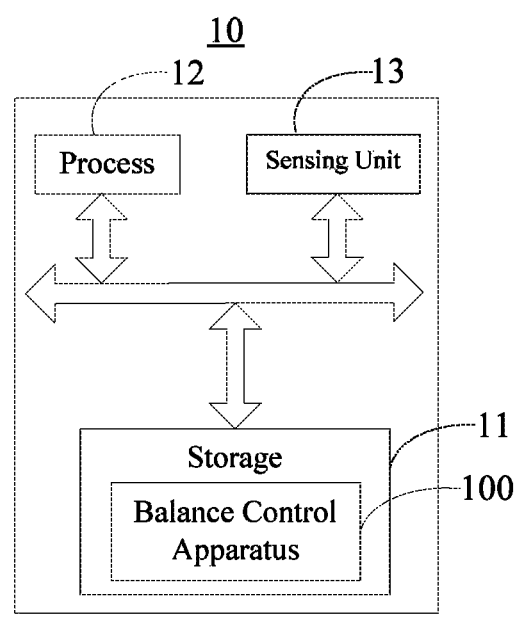
FIG. 1 is a schematic block diagram of a humanoid robot according to an embodiment of the present disclosure.

In order to make the objects, technical schemes and advantages of the present disclosure more clear, the technical solutions in the embodiments of the present disclosure will be clearly and completely described below with reference to the drawings. Apparently, the described embodiments are part of the embodiments of the present disclosure, not all of the embodiments. The components in the embodiments that are described and shown in the drawings may generally be arranged and designed in various configurations.

Therefore, the following detailed description for the embodiments provided in the drawings is not intended to limit the scope of the present disclosure, but merely represents the embodiments of the present disclosure. All other embodiments obtained by those skilled in the art without creative efforts are within the scope of the present disclosure.

It should be noted that, similar reference numerals and letters indicate similar items in the following figures. Therefore, once an item is defined in one figure, it will not be further defined and explained in subsequent figures.

It should be noted that, in the present disclosure, relational terms such as first and second are only for distinguishing one entity/operation from another entity/operation, and do not necessarily require or imply any relationship or order between these entities/operations. Moreover, the terms "include", "comprise" or any other variants thereof are intended to cover non-exclusive inclusion, so that a process, method, object or apparatus including a series of elements not only includes the elements, but also includes other elements that are not explicitly listed or the elements inherent to the process, method, object or apparatus. The element defined by the sentence "including a . . . " does not exclude other same elements in the process, method, object or apparatus if there is no specific restriction thereto.

The embodiments of the present disclosure will be described in detail with reference to the drawings. In the case of no conflict, the following embodiments and features therein can be combined with each other.

FIG. 1 is a schematic block diagram of a humanoid robot according to an embodiment of the present disclosure. As shown in FIG. 1, in this embodiment, a humanoid robot 10 is provided, which may be, for example, a biped robot having a body and two legs, and each of the legs has at least a joint with a servo driven by a motor, where the movement of the legs is realized by the motor rotating an output shaft of the servo which is connected to the leg. The humanoid robot 10 can avoid control interferences between three balance control parts of a sole (of a foot of the leg), a centroid, and a waist of the body during balance control, the effect of the balance control at each of the three balance control parts (i.e., the sole, the centroid, or the waist) can be realized simultaneously by adjusting the motion state of the joint(s) of the humanoid robot 10, thereby reducing the difficulty of the balance control of the humanoid robot 10.

In which, the humanoid robot 10 may include an upper body (e.g., a lower part of the above-mentioned body), a hip joint driving structure, and two mechanical leg structures. The two mechanical leg structures are located on two sides of the hip joint driving structure, respectively, to connect to the hip joint driving structure. The upper body is connected with the hip joint driving structure, and the position of the connection of the hip joint driving structure and the upper body is between the two mechanical leg structures. The position the hip joint driving structure that is connected to each mechanical leg structure may be provided with two mutually orthogonal rotatable driving structures, so as to realize the alternate positional change between the two mechanical leg structures, and a rotatable driving structure is provided at a knee joint of each mechanical leg structure for realizing the knee bending of the corresponding mechanical leg structure.

In this embodiment, the humanoid robot 10 further includes a balance control apparatus 100, a storage 11, a processor 12, and a sensing unit 13. The storage 11, the processor 12, and the sensing unit 13 are directly or indirectly electrically connected to each other to realize data transmission or interaction. For example, the storage 11, the processor 12, and the sensing unit 13 may be electrically connected through one or more communication buses or signal lines.

The storage 11 may be configured to store program(s), and the processor 12 can execute the program(s) accordingly upon receiving an execution instruction. In which, the storage 11 may be, but is not limited to, a random access memory (RAM), a read only memory (ROM), and a programmable read-only memory (PROM), an erasable programmable read-Only memory (EPROM), electric erasable programmable read-only memory (EEPROM), and the like. The storage 11 is further configured to specify an expected balance trajectory to the humanoid robot 10 for maintain balance when the humanoid robot 10 walks or steps in situ. When the motion state of the humanoid robot 10 is consistent with the motion state of the expected balance trajectory at a certain moment, it can be ensured that the humanoid robot 10 is currently in a balanced state.

The processor 12 may be an integrated circuit chip with signal processing capability. The processor 12 may be a general-purpose processor including a central processing unit (CPU) a network processor (NP), or the like. The general-purpose processor may be a microprocessor or the processor may also be any conventional processor, which may implement or execute the methods, steps, and logical block diagrams in the embodiments.

The sensing unit 13 may be configured to collect motion data of the humanoid robot 10, for example, to monitor the real-time angular velocity of the humanoid robot 10 at each joint (including real joint and virtual joint), monitor the real-time angular displacement of the humanoid robot 10 at the joint, and monitor the motion pose (including position and posture) and motion speed of each part of the humanoid robot 10.

In this embodiment, the balance control apparatus 100 may include at least one software functional module that can be stored in the storage 11 in the form of software or firmware or solidified in the operating system of the robotic arm 100. The processor 12 may execute executable modules stored in the storage 11, for example, software functional modules included in the balance control apparatus 100, computer programs, and the like. The humanoid robot 10 focus on the parts of the humanoid robot 10 through the balance control apparatus 100, which adjusts the motion state of each real joint which can simultaneously affect the effect of the balance control of each part (including the sole, the centroid, and the waist) of the humanoid robot 10, so as to realize the overall balance effect of the humanoid robot 10, thereby avoiding the control interferences between the sole control, the centroid control, and the waist control during the balance control, and at the same time meet the control needs of the humanoid robot 10 at the sole, the centroid and the waist so as to reduce the difficulty of balance control.

It can be understood that, the block diagram shown in FIG. 1 is only a schematic diagram of the structure of the humanoid robot 10, and the humanoid robot 10 may also include more or fewer components than those shown in FIG. 1, or it may have a different configuration from that shown in FIG. 1. The components shown in FIG. 1 may be implemented through hardware, software or a combination thereof.

In this embodiment, in order to ensure that the humanoid robot 10 can meet the control requirements at the sole, the centroid, and the waist at the same time during the balance control, avoid the control interferences between the sole control, the centroid control, and the waist control, and reduce the difficulty of balance control, a balance control method for the above-mentioned humanoid robot 10 which implements the above-mentioned functions is provided. The provided balance control method will be described below.

Figure 2:
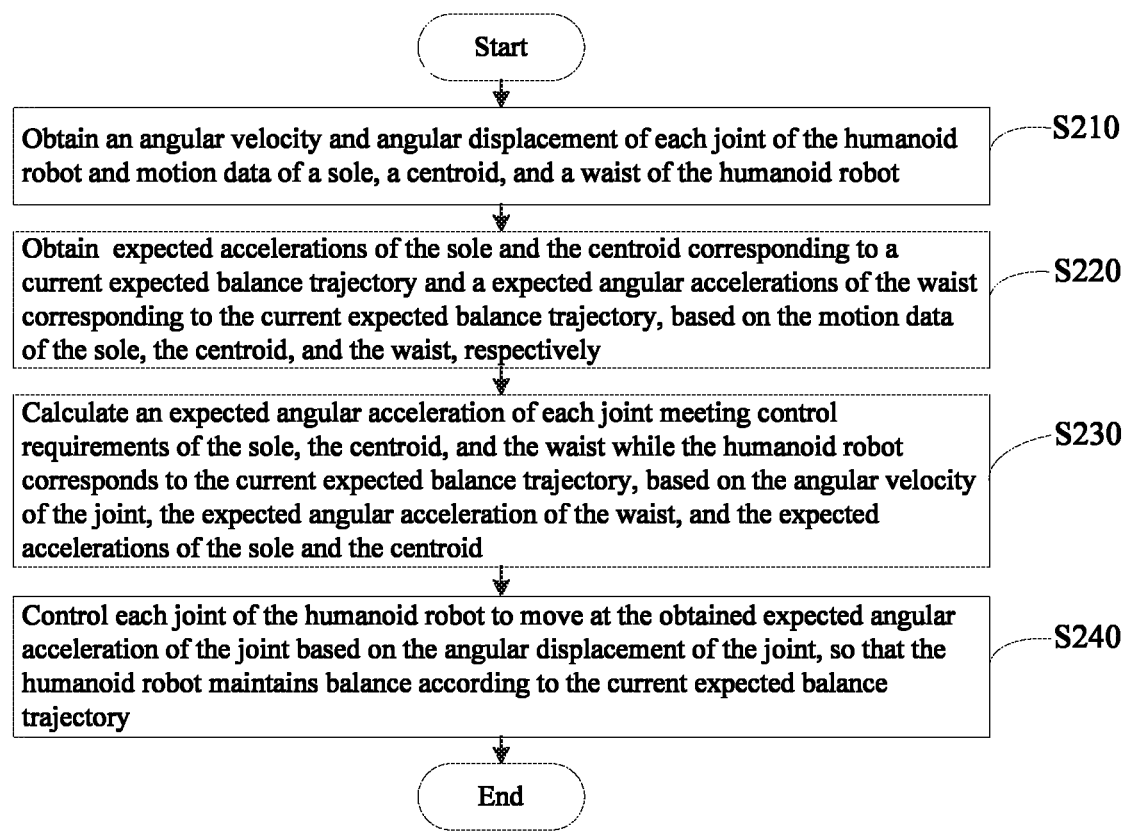
FIG. 2 is a flow chart of a balance control method according to an embodiment of the present disclosure.

FIG. 2 is a flow chart of an embodiment of a balance control method according to the present disclosure. In this embodiment, a balance control method for the above-mentioned humanoid robot 10 is provided. The method is a computer-implemented method executable for a processor. In one embodiment, the method may be implemented through the robot humanoid 10 of FIG. 1 or a balance control apparatus shown in FIG. 9. As shown in FIG. 1, the method includes the following steps.

S210: obtaining an angular velocity and angular displacement of each joint of the humanoid robot and motion data of a sole of the humanoid robot, motion data of a centroid of the humanoid robot, and motion data of a waist of the humanoid robot.

In this embodiment, the current motion data of the humanoid robot 10 at the sole includes a motion speed and a motion pose of the sole, the current motion data of the humanoid robot 10 at the centroid includes a motion speed and a motion pose of the centroid, and the current motion data of the humanoid robot 10 at the waist includes a motion posture angle and a motion angular velocity of the waist. The humanoid robot 10 may monitor its own angular velocity of each joint (including an angular velocity of each real joint of the humanoid robot 10 and an angular velocity of each virtual joint for describing the pose of the space of the waist of the humanoid robot 10) and an angular displacement of each joint (including an angular displacement of each real joint of the humanoid robot 10 and an angular displacement of each virtual joint for describing the pose of the space of the waist of the humanoid robot 10) and collect the motion data of the sole, the centroid, and the waist in real time through the sensing unit 13.

S220: obtaining an expected acceleration of the sole corresponding to a current expected balance trajectory, an expected acceleration of the centroid corresponding to the current expected balance trajectory, and an expected angular acceleration of the waist corresponding to the current expected balance trajectory, based on the motion data of the sole, the motion data of the centroid, and the motion data of the waist, respectively.

In this embodiment, when the humanoid robot 10 determines its current motion data of the sole, the centroid, and the waist, it will first determine its own expected balance trajectory at the current moment, and then determine a motion state difference between the motion data of the sole, the centroid, and the waist and that at the current expected balance trajectory, so as to determine the expected accelerations required for the sole and centroid to achieve the balance effect matching the current expected balance trajectory, and the expected angular acceleration required for the waist to achieve the balance effect matching the current balance desired trajectory. In which, the relevant calculations of the expected accelerations of the sole and the centroid and the expected angular acceleration of the waist can be performed by other electronic devices and send the related data to the humanoid robot 10. The related calculations of the expected acceleration of the sole and the centroid and the expected angular acceleration of the waist can also be directly performed by the humanoid robot 10 itself.

Therefore, in order to ensure that the humanoid robot 10 can obtain the expected acceleration and the expected angular acceleration corresponding to the current motion data of the sole, the centroid, and the waist, sub-steps of step S220 that are shown in FIG. 3 and FIG. 4 A is provided.

FIG. 3 is a flow chart of example one of sub-steps in step S220 of the method of FIG. 2. As shown in FIG. 3, in this embodiment, the expected balance trajectory of the humanoid robot 10 includes preset balance trajectories corresponding to two balance control parts of the sole and the centroid, respectively, where the preset balance trajectory includes a reference acceleration, a reference pose, and a reference velocity of the corresponding balance control part. At this time, the obtaining the expected acceleration of the sole and the expected acceleration of the centroid corresponding to the current expected balance trajectory, based on the motion data of the sole and centroid of the humanoid robot 10, respectively in step S220 may include sub-steps S221, S222, and S223.

S221: for each balance control part corresponding to the sole and the centroid, subtracting the reference pose and the motion pose of the balance control part and subtracting the reference speed and the motion speed of the balance control part to obtain a corresponding pose difference and speed difference.

In this embodiment, for the two balance control parts of the sole and the centroid, the humanoid robot 10 will calculate the difference between the reference pose of each of the two balance control parts (i.e., the sole or the centroid) at the current moment and the obtained motion pose, and the difference between the reference speed of the two balance control part at the current moment and the obtained motion speed. That is, the reference pose of the balance control part at the current moment is subtracted from the obtained motion pose to obtain the corresponding pose difference, and the reference speed of the balance control part at the current time is subtracted from the obtained motion speed to obtain the corresponding speed difference.

At this time, for the sole, $r_\Delta^{Foot}(k)$ can be used to represent the pose difference of the sole at the moment k, and $v_\Delta^{Foot}(k)$ can be used to represent the speed difference of the sole at the moment k. In which, the formula for calculating the pose difference and the speed difference of the sole can be respectively expressed through equations of:

$$r_\Delta^{Foot}(k) = r_{ref}^{Foot}(k) - r^{Foot}(k); \text{ and}$$

$$v_\Delta^{Foot}(k) = v_{vef}^{Foot}(k) - v^{Foot}(k);$$

where, $r_\Delta^{Foot}(k)$ represents the reference pose of the sole at the moment k, $r^{Foot}(k)$ represents the motion pose of the sole with respect to the world coordinate system at the moment k, $v_{ref}^{Foot}(k)$ represents the reference speed of the sole at the moment k, and $v^{Foot}(k)$ represents the motion speed of the sole with respect to the world coordinate system at the moment k.

At this time, for the centroid, $r_\Delta^{COM}(k)$ can be used to represent the pose difference of the centroid at the moment k, and $v_\Delta^{COM}(k)$ can be used to represent the speed difference of the centroid at the moment k. In which, the formula for calculating the pose difference and the speed difference of the centroid can be respectively expressed through equations of:

$$r_\Delta^{COM}(k) = r_{ref}^{COM}(k) - r^{COM}(k); \text{ and}$$

$$v_\Delta^{COM}(k) = v_{vef}^{COM}(k) - v^{COM}(k);$$

where, $r_{ref}^{COM}(k)$ represents the reference pose of the centroid at the moment k, $r^{COM}(k)$ represents the motion pose of the centroid with respect to the world coordinate system at the moment k, $v_{ref}^{COM}(k)$ represents the reference speed of the centroid at the moment k, and $v^{COM}(k)$ represents the motion speed of the centroid with respect to the world coordinate system at the moment k.

S222: selecting a difference parameter matching a preset control function corresponding to the balance control part from the obtained pose difference and speed difference.

In this embodiment, the preset control function is for adjusting the motion state of the corresponding balance control part to an expected state. The principles of the control algorithms adopted by the preset control functions corresponding to different balance control parts can be the same or different. For example, the preset control function for the sole can use any one of PID control algorithm, PI control algorithm, PD control algorithm and P control algorithm, and the preset control function for the centroid can use any one of PID control algorithm, PI control algorithm, PD control algorithm and P control algorithm. In which, different preset control functions for the same balance control part may also use different parameters to perform related calculations of the expected acceleration due to different algorithm principles involved. Therefore, after the humanoid robot 10 determines the pose difference and the speed difference of the centroid or the sole at the current moment, the difference parameter involved in the currently selected preset control function will be selected from the determined pose difference and speed difference according to the selected preset control function.

In one embodiment, if the preset control function of the sole is implemented based on the PD control algorithm, the difference parameters involved in the preset control function include the pose difference and the speed difference, and the preset control function can be expressed as:

$$a_d^{Foot}(k) = a_{ref}^{Foot}(k) + K_{pF} * r_\Delta^{Foot}(k) + K_{dF} * v_\Delta^{Foot}(k).$$

If the preset control function of the sole is implemented based on the PID control algorithm, the difference parameters involved in the preset control function include the pose difference and the speed difference, and the preset control function can be expressed as:

$$a_d^{Foot}(k) = a_{ref}^{Foot}(k) + K_{pF} * r_\Delta^{Foot}(k) + K_{iF} \sum_{j=0}^{k} r_\Delta^{Foot}(k) + K_{dF} * v_\Delta^{Foot}(k).$$

If the preset control function of the sole is implemented based on the PI control algorithm, the difference parameters involved in the preset control function include the pose difference, and the preset control function can be expressed as:

$$a_d^{Foot}(k) = a_{ref}^{Foot}(k) + K_{pF} * r_\Delta^{Foot}(k) + K_{iF} \sum_{j=0}^{k} r_\Delta^{Foot}(k);$$

If the preset control function of the sole is implemented based on the P control algorithm, the difference parameters involved in the preset control function include the pose difference, and the preset control function can be expressed as:

$$a_d^{Foot}(k) = a_{ref}^{Foot}(k) + K_{pf} * r_\Delta^{Foot}(k);$$

where, $a_d^{Foot}(k)$ represents the expected acceleration of the sole at the moment k, $a_{ref}^{Foot}(k)$ represents the reference acceleration of the sole at the moment k, $r_\Delta^{Foot}(k)$ represents the pose difference of the sole at the moment k, $v_\Delta^{Foot}(k)$ represents the speed difference of the sole at the moment k, $K_{pF}$ is a control coefficient of the sole in proportional control, $K_{iF}$ is a control coefficient of the sole in integral control, and $K^{dF}$ is a control coefficient of the sole in differential control.

In another embodiment, if the preset control function of the centroid is implemented based on the PD control algorithm, the difference parameters involved in the preset control function include the pose difference and the speed difference, and the preset control function can be expressed as:

$$a_d^{COM}(k) = a_{ref}^{COM}(k) + K_{pC} * r_\Delta^{COM}(k) + K_{dC} * v_\Delta^{COM}(k).$$

If the preset control function of the centroid is implemented based on the PID control algorithm, the difference parameters involved in the preset control function include the pose difference and the speed difference, and the preset control function can be expressed as:

$$a_d^{COM}(k) = a_{ref}^{COM}(k) + K_{pC} * r_\Delta^{COM}(k) + K_{iC} \sum_{j=0}^{k} r_\Delta^{COM}(k) + K_{dC} * v_\Delta^{COM}(k).$$

If the preset control function of the centroid is implemented based on the PI control algorithm, the difference parameters involved in the preset control function include the pose difference, and the preset control function can be expressed as:

$$a_d^{COM}(k) = a_{ref}^{COM}(k) + K_{pC} * r_\Delta^{COM}(k) + K_{iC} \sum_{j=0}^{k} r_\Delta^{COM}(k).$$

If the preset control function of the centroid is implemented based on the P control algorithm, the difference parameters involved in the preset control function include the pose difference, and the preset control function can be expressed as:

$$a_d^{COM}(k) = a_{ref}^{COM}(k) + K_{pC} * r_\Delta^{COM}(k);$$

where, $a_d^{COM}(k)$ represents the expected acceleration of the centroid at the moment k, $a_{ref}^{COM}(k)$ represents the reference acceleration of the centroid at the moment k, $r_\Delta^{COM}(k)$ represents the pose difference of the centroid at the moment k, $v_\Delta^{COM}(k)$ represents the speed difference of the centroid at the moment k, $K_{pC}$ is a control coefficient of the centroid in proportional control, $K_{iC}$ is a control coefficient of the centroid in integral control, and $K_{dC}$ is a control coefficient of the centroid in differential control.

S223: substituting the reference acceleration of the balance control part and the selected difference parameter into the corresponding preset control function to obtain the expected acceleration of the balance control part.

In this embodiment, after the humanoid robot 10 determines the difference parameter involved in the matching of the preset control function that corresponds to the centroid or the sole at the current moment, the reference acceleration of the corresponding balance control part and the selected difference parameter will be substituted into the corresponding preset control function for parameter calculation to obtain the expected acceleration of the balance control part. The preset control function can be designed with reference to the above-mentioned two embodiments.

FIG. 4 is a flow chart of example two of sub-steps in step S220 of the method of FIG. 2. As shown in FIG. 4, in this embodiment, the expected balance trajectory of the humanoid robot 10 further includes a preset balance trajectory of the waist, where the preset balance trajectory of the waist includes a reference angular acceleration, a reference posture angle, and a reference angular velocity of the waist, and the obtaining the expected angular acceleration of the waist corresponding to the current expected balance trajectory, based on the motion data of the waist of the humanoid robot 10 in step S220 may include sub-steps S225, S226, and S227.

S225: subtracting the reference posture angle and the motion posture angle of the waist and subtracting the reference angular velocity and the motion angular velocity of the waist to obtain a corresponding posture angle difference and angular velocity difference.

In this embodiment, for the balance control part of the waist, the humanoid robot 10 will calculate the difference between the reference posture angle of the balance control part (i.e., the waist) at the current moment and the obtained motion posture angle, and the difference between the reference angular velocity of the balance control part at the current moment and the obtained motion angular velocity. That is, the reference posture angle of the balance control part at the current moment is subtracted from the obtained motion posture angle to obtain the corresponding posture angle difference, and the reference angular velocity of the balance control part at the current time is subtracted from the obtained motion angular velocity to obtain the corresponding angular velocity difference.

At this time, for the waist, $r_\Delta^{Waist}(k)$ can be used to represent the posture angle difference of the waist at the moment k, and $v_\Delta^{Waist}(k)$ can be used to represent the angular velocity difference of the waist at the moment k. In which, the formula for calculating the posture angle difference and the angular velocity difference of the waist can be respectively expressed through equations of:

$$r_\Delta^{Waist}(k) = r_{ref}^{Waist}(k) - r^{Waist}(k); \text{ and}$$

$$v_\Delta^{Waist}(k) = v_{ref}^{Waist}(k) - v^{Waist}(k);$$

where, $r_{ref}^{Waist}(k)$ represents the reference posture angle of the waist at the moment k, $r^{Waist}(k)$ represents the motion posture angle of the waist with respect to the world coordinate system at the moment k, $v_{ref}^{Waist}(k)$ represents the reference angular velocity of the waist at the moment k, and $v^{Waist}(k)$ represents the motion angular velocity of the waist with respect to the world coordinate system at the moment k.

S226: selecting a difference angle parameter matching a preset control function corresponding to the waist from the posture angle difference and the angular velocity difference.

In this embodiment, the preset control function corresponding to the waist may also adopt any one of PID control algorithm, PI control algorithm, PD control algorithm, and P control algorithm. After the humanoid robot 10 determines the posture angle difference and the angular velocity difference of the waist at the current moment, the difference angle parameter involved in the preset control function will be selected from the determined posture angle difference and the angular velocity difference according to the currently selected preset control function.

In one embodiment, if the preset control function of the waist is implemented based on the PD control algorithm, the difference parameters involved in the preset control function include the posture angle difference and the angular velocity difference, and the preset control function can be expressed as:

$$a_d^{Waist}(k) = a_{ref}^{Waist}(k) + K_{pF} * r_\Delta^{Waist}(k) + K_{dF} * v_\Delta^{Waist}(k).$$

If the preset control function of the waist is implemented based on the PID control algorithm, the difference parameters involved in the preset control function include the posture angle difference and the angular velocity difference, and the preset control function can be expressed as:

$$a_d^{Waist}(k) = a_{ref}^{Waist}(k) + K_{pW} * r_\Delta^{Waist}(k) + K_{iW} \sum_{j=0}^{k} r_\Delta^{Waist}(k) + K_{dW} * v_\Delta^{Waist}(k).$$

If the preset control function of the waist is implemented based on the PI control algorithm, the difference parameters involved in the preset control function include the posture angle difference, and the preset control function can be expressed as:

$$a_d^{Waist}(k) = a_{ref}^{Waist}(k) + K_{pW} * r_\Delta^{Waist}(k) + K_{iW} \sum_{j=0}^{k} r_\Delta^{Waist}(k).$$

If the preset control function of the waist is implemented based on the P control algorithm, the difference parameters involved in the preset control function include the posture angle difference, and the preset control function can be expressed as:

$$a_d^{Waist}(k) = a_{ref}^{Waist}(k) + K_{pF} * r_\Delta^{Waist}(k)$$

where, $a_d^{Waist}(k)$ represents the expected angular acceleration of the waist at the moment k, $a_{ref}^{Waist}(k)$ represents the reference angular acceleration of the waist at the moment k, $a_\Delta^{Waist}(k)$ represents the posture angle difference of the waist at the moment k, $v_\Delta^{Waist}(k)$ represents the angular velocity difference of the waist at the moment k, $K_{pW}$ is a control coefficient of the waist in proportional control, $K_{iW}$ is a control coefficient of the waist in integral control, and $K_{dW}$ is a control coefficient of the waist in differential control.

S227: substituting the reference angular acceleration of the waist and the selected difference angle parameter into the corresponding preset control function to obtain the expected angular acceleration of the waist.

In this embodiment, after the humanoid robot 10 determines the difference angle parameter involved in the matching of the preset control function that corresponds to the waist at the current moment, the reference angular acceleration of the corresponding balance control part and the selected difference angle parameter will be substituted into the corresponding preset control function for parameter calculation to obtain the expected angular acceleration of the balance control part. The preset control function can be designed with reference to the embodiment about the waist.

S230: calculating an expected angular acceleration of each joint meeting a control requirement of the sole, a control requirement of the centroid, and a control requirement of the waist while the humanoid robot corresponds to the current expected balance trajectory, based on the angular velocity of the joint, the expected angular acceleration of the waist, the expected acceleration of the sole, and the expected acceleration of the centroid.

As shown in FIG. 2, in this embodiment, after the humanoid robot 10 determines the current angular velocity of each joint, the expected angular accelerations of the waist, and the expected accelerations of the sole and the centroid, from the view of device control which affects the of the sole control effect, the centroid control effect, and the waist control effect at the same time, the motion state of each joint of the humanoid robot 10 is controlled so as to meet the needs of the sole, the centroid, and the waist for balance at the same time through the adjusted state of the joint, thereby avoiding the control interferences between the sole control, the centroid control, and the waist control during the balance control to reduce the difficulty of balance control. The following describes an example which introduces the concepts of null space and pseudo-inverse matrix to obtain the expected angular acceleration of each joint that corresponds to the current expected balance trajectory in detail. In which, the control requirement of the sole can be ensuring the sole of the humanoid robot 10 not leaving the ground, the control requirement of the centroid can be ensuring the humanoid robot 10 not turning over, and the control requirement of the waist control can be ensuring the humanoid robot 10 really recovering to the balance state.

Figure 5:
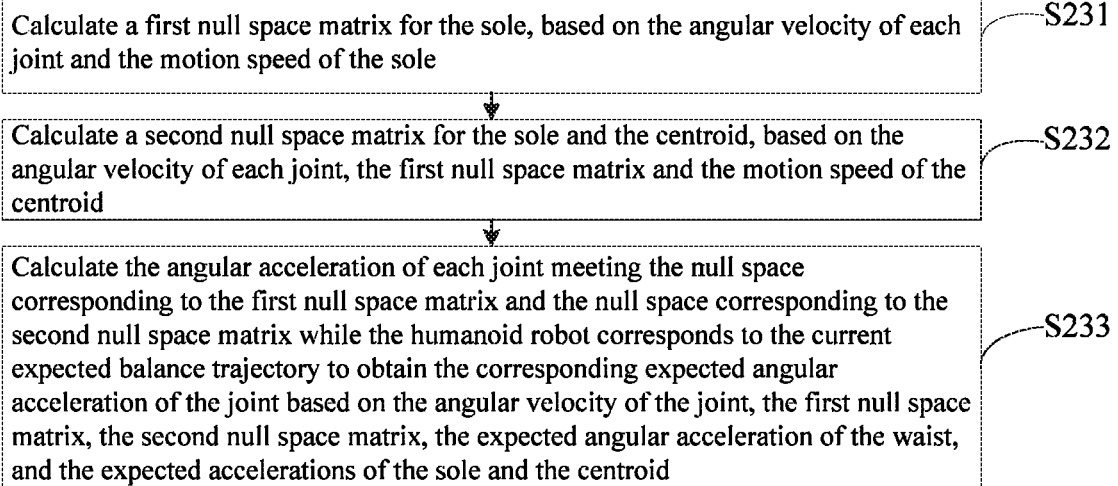
FIG. 5 is a flow chart of an example of sub-steps in step S230 of the method of FIG. 2.

FIG. 5 is a flow chart of an example of sub-steps in step S230 of the method of FIG. 2. As shown in FIG. 5, step S230 may include sub-steps S231, S232, and S233.

S231: calculating a first null space matrix for the sole, based on the angular velocity of each joint and the motion speed of the sole.

In this embodiment, the first null space matrix is for representing the condition of the null space of the mapping relationship between the motion speed of the sole and the angular velocity of each joint. The humanoid robot 10 may determine the mapping relationship between the current motion speed of the sole and the angular velocity of each joint, and then determine the corresponding first null space matrix based on the mapping relationship.

Figure 6:
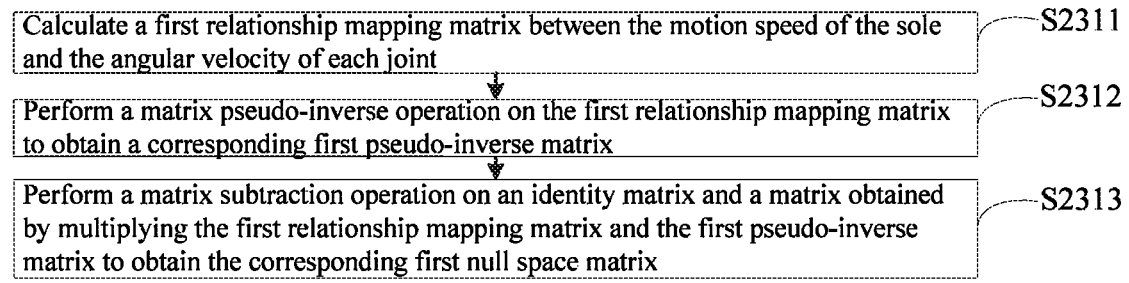
FIG. 6 is a flow chart of an example of sub-steps in step S231 of the method of FIG. 5.

FIG. 6 is a flow chart of an example of sub-steps in step S231 of the method of FIG. 5. As shown in FIG. 6, step S231 may include sub-steps S2311, S2312, and S2313.

S2311: calculating a first relationship mapping matrix between the motion speed of the sole and the angular velocity of each joint.

S2312: perform a matrix pseudo-inverse operation on the first relationship mapping matrix to obtain a corresponding first pseudo-inverse matrix.

S2313: performing a matrix subtraction operation on an identity matrix and a matrix obtained by multiplying the first relationship mapping matrix and the first pseudo-inverse matrix to obtain the corresponding first null space matrix.

In this embodiment, the mapping relationship between the motion speed of the sole and the angular velocity of each joint can be expressed through an equation of:

$$v^{Foot}=J^{Foot}\dot{q};$$

where, $v^{Foot}$ is a matrix of the motion speed of the sole in the world coordinate system, $\dot{q}$ is a matrix of the angular velocity of each joint, and $J^{Foot}$ represents the first relationship mapping matrix. The first relationship mapping matrix is a Jacobian matrix.

The formula for calculating the first pseudo-inverse matrix can be expressed through an equation of:

$$(J^{Foot})^+=(J^{Foot})^T(J^{Foot}(J^{Foot})^T)^{-1};$$

where, $J^{Foot}$ represents the first relationship mapping matrix, and $(J^{Foot})^+$ represents the first pseudo-inverse matrix.

The formula for calculating the first null space matrix can be expressed through an equation of:

$$N_1=I-(J^{Foot})^+J^{Foot};$$

where, $N_1$ represents the first null space matrix, I is an identity matrix, $J^{Foot}$ represents the first relationship mapping matrix, and $(J^{Foot})^+$ represents the first pseudo-inverse matrix.

S232: calculating a second null space matrix for the sole and the centroid, based on the angular velocity of each joint, the first null space matrix and the motion speed of the centroid.

In this embodiment, the second null space matrix is for representing the condition of the null space of the mapping relationship between the motion speed of the centroid and the angular velocity of each joint which affects the control effect of sole in the null space corresponding to the first null space matrix. The humanoid robot 10 may determine the mapping relationship between the current motion speed of the centroid and the angular velocity of each joint, and then determine the corresponding second null space matrix based on the mapping relationship and the first null space matrix.

Figure 7:
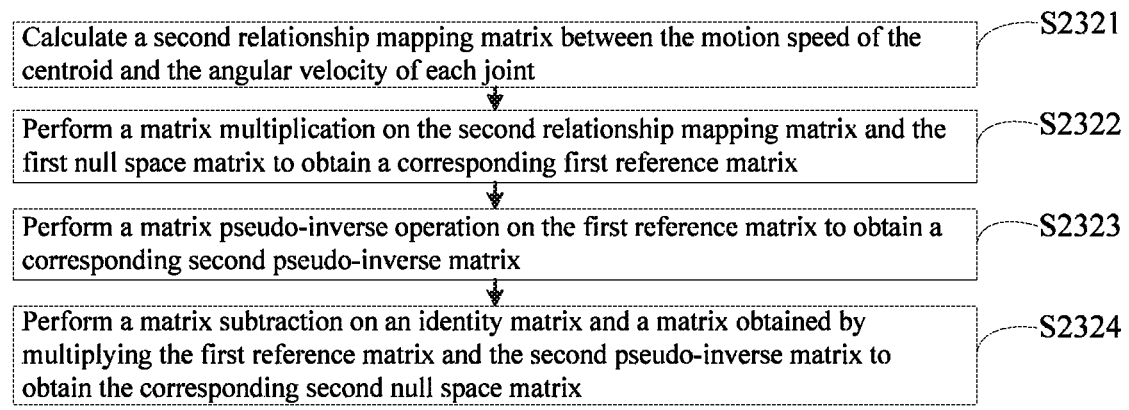
FIG. 7 is a flow chart of an example of sub-steps in step S232 of the method of FIG. 5.

FIG. 7 is a flow chart of an example of sub-steps in step S232 of the method of FIG. 5. As shown in FIG. 7, step S231 may include sub-steps S2321, S2322, S2323, and S2324.

S2321: calculating a second relationship mapping matrix between the motion speed of the centroid and the angular velocity of each joint.

S2322: performing a matrix multiplication on the second relationship mapping matrix and the first null space matrix to obtain a corresponding first reference matrix.

S2323: performing a matrix pseudo-inverse operation on the first reference matrix to obtain a corresponding second pseudo-inverse matrix.

S2324: performing a matrix subtraction on an identity matrix and a matrix obtained by multiplying the first reference matrix and the second pseudo-inverse matrix to obtain the corresponding second null space matrix.

In this embodiment, the mapping relationship between the motion speed of the centroid and the angular velocity of each joint can be expressed through an equation of:

$$v^{COM}=J^{COM}\dot{q};$$

where, $v^{COM}$ is a matrix of the motion speed of the centroid in the world coordinate system, $\dot{q}$ is a matrix of the angular velocity of each joint, and $J^{COM}$ represents the second relationship mapping matrix. The second relationship mapping matrix is a Jacobian matrix.

The formula for calculating the second pseudo-inverse matrix can be expressed through an equation of:

$$(J^{COM}N_1)^+=(J^{COM}N_1)^T(J^{COM}N_1(J^{COM}N_1)^T)^{-1};$$

where, $J^{COM}N_1$ represents the first relationship mapping matrix, and $(J^{COM}N_1)^+$ represents the second pseudo-inverse matrix.

The formula for calculating the second null space matrix can be expressed through an equation of:

$$N_2=I-(J^{COM}N_1)^+J^{COM}N_1;$$

where, $N_2$ represents the second null space matrix, I is an identity matrix, $J^{COM}N_1$ represents the first relationship mapping matrix, $(J^{COM}N_1)^+$ and represents the second pseudo-inverse matrix.

S233: calculating the angular acceleration of each joint meeting the null space corresponding to the first null space matrix and the null space corresponding to the second null space matrix while the humanoid robot corresponds to the current expected balance trajectory to obtain the corresponding expected angular acceleration of the joint based on the angular velocity of the joint, the first null space matrix, the second null space matrix, the expected angular acceleration of the waist, the expected acceleration of the sole, and the expected acceleration of the centroid.

In this embodiment, after the humanoid robot 10 determines the first null space matrix and the second null space matrix, based on the influence relationship between the sole control, the centroid control, and the waist control, it can calculate the expected angular acceleration of each joint that effectively corresponds to the current expected balance trajectory in the null space corresponding to the first null space matrix and the null space corresponding to the second null space matrix for the purpose of eliminating the control interferences between the three controls.

In which, when the humanoid robot 10 alone regards the sole control as the most important first-level sub-control task in the balance control, the control relationship between the sole control and the angular acceleration of each joint can be expressed through an equation of:

$$a^{Foot}=J^{Foot}\ddot{q}+\dot{J}^{Foot}\dot{q};$$

where, $a^{Foot}$ is a matrix of the acceleration of the sole in the world coordinate system, $J^{Foot}$ represents the first relationship mapping matrix, $\dot{J}^{Foot}$ represents the derivative of the first relationship mapping matrix, $\dot{q}$ is a matrix of the angular velocity of each joint, $\ddot{q}$ is a matrix of the angular acceleration of each joint.

At this time, when the humanoid robot 10 needs to adjust the sole control to ensure that the sole does not leave the ground, it needs to ensure that the null space corresponding to the first null space matrix meets $\ddot{q}$ in the above-mentioned equation, then the angular acceleration of each joint can be solved through an equation of:

$$\ddot{q}=(J^{Foot})^+(a_d^{Foot}-\dot{J}^{Foot}\dot{q})+N_1\xi_1.$$

where, $(J^{Foot})^+$ represents the first pseudo-inverse matrix, $a_d^{Foot}$ represents the expected acceleration of the sole, $\dot{J}^{Foot}$ represents the derivative of the first relationship mapping matrix, $\dot{q}$ is a matrix of the angular velocity of each joint, $N_1$ represents the first null space matrix, and $\xi_1$ may be any vector.

In which, when the humanoid robot 10 alone regards the centroid control as a secondary important second-level sub-control task in the balance control, the control relationship between the centroid control and the angular acceleration of each joint can be expressed through an equation of:

$$a^{COM} = J^{COM}\ddot{q} + \dot{J}^{COM}\dot{q};$$

where, $a^{COM}$ is a matrix of the acceleration of the centroid in the world coordinate system, $J^{COM}$ represents the second relationship mapping matrix, $\dot{J}^{COM}$ represents the derivative of the second relationship mapping matrix, $\dot{q}$ is a matrix of the angular velocity of each joint, $\ddot{q}$ is a matrix of the angular acceleration of each joint.

At this time, when the humanoid robot 10 needs to adjust the centroid control to ensure that the robot does not turn over, it has to solve $\ddot{q}$ in the above-mentioned equation in the null space corresponding to the first null space matrix on the basis of ensuring that the sole control can make the sole not leaving the ground. In which, $\xi_1$ must be a certain vector so as to achieve the expected effects of the first-level sub-control tasks and the second-level sub-control tasks simultaneously. At this time, the value of $\xi_1$ can be solved through an equation of:

$$\xi_1 = (J^{COM}N_1)^+(a_d^{COM} - \dot{J}^{COM}\dot{q} - J^{COM}(J^{Foot})^+(a_d^{Foot} - \dot{J}^{Foot}\dot{q})) + N_2\xi_2;$$

where, $J^{COM}$ represents the second relationship mapping matrix, $(J^{COM}N_1)^+$ represents the second pseudo-inverse matrix, $a_d^{COM}$ represents the expected acceleration of the centroid, $\dot{J}^{COM}$ represents the derivative of the second relationship mapping matrix, $N_2$ represents the second null space matrix, $(J^{Foot})^+$ represents the first pseudo-inverse matrix, $a_d^{Foot}$ represents the expected acceleration of the sole, $\dot{J}^{Foot}$ represents the derivative of the first relationship mapping matrix, $\dot{q}$ is a matrix of the angular velocity of each joint, $N_1$ represents the first null space matrix, and $\xi_2$ may be any vector.

In which, when the humanoid robot 10 alone regards the waist control as the least important third-level sub-control task in the balance control, the control relationship between the waist control and the angular acceleration of each joint can be expressed through an equation of:

$$a^{Waist} = J^{Waist}\ddot{q} + \dot{J}^{Waist}\dot{q};$$

where, $a_d^{Waist}$ is a matrix of the acceleration of the waist in the world coordinate system, $J^{Waist}$ represents the third relationship mapping matrix for representing the mapping relationship between the motion angular velocity of the waist and the angular velocity of each joint, $\dot{J}^{waist}$ represents the derivative of the third relationship mapping matrix, $\dot{q}$ is a matrix of the angular velocity of each joint, $\ddot{q}$ is a matrix of the angular acceleration of each joint.

At this time, when the humanoid robot 10 needs to adjust the waist control to ensure that the robot is in a balanced state, it has to solve $\ddot{q}$ in the above-mentioned equation in the null space corresponding to the second null space matrix on the basis of ensuring that the expected effects of the first-level sub-control tasks and the second-level sub-control tasks are achieved simultaneously. In which, $\xi_2$ must be a certain vector. At this time, the value of $\xi_2$ can be solved through an equation of:

$$\xi_2 = (J^{Waist}N_1N_2)^+[a_d^{Waist} - \dot{J}^{Waist}\dot{q} - J^{Waist}(J^{Foot})^+ \\ (a_d^{Foot} - \dot{J}^{Foot}\dot{q}) - J^{Waist}N_1(J^{COM}N_1)^+(a_d^{COM} - \\ \dot{J}^{COM}\dot{q} - J^{COM}(J^{Foot})^+(a_d^{Foot} - \dot{J}^{Foot}\dot{q}))];$$

where, $J^{Foot}$ represents the first relationship mapping matrix, $(J^{Foot})^+$ represents the first pseudo-inverse matrix, $a_d^{Foot}$ represents the expected acceleration of the sole, $\dot{J}^{Foot}$ represents the derivative of the first relationship mapping matrix, $\dot{q}$ is a matrix of the angular velocity of each joint, $N_1$ represents the first null space matrix, $J^{COM}$ represents the second relationship mapping matrix, $(J^{COM}N_1)^+$ represents the second pseudo-inverse matrix, $a_d^{COM}$ represents the expected acceleration of the centroid, $\dot{J}^{COM}$ represents the derivative of the second relationship mapping matrix, $N_2$ represents the second null space matrix, $J^{Waist}$ represents the third relationship mapping matrix, $(J^{Waist}N_1N_2)^+$ represents the third pseudo-inverse matrix that is obtained by performing pseudo-inverse operation on the second reference matrix calculated by performing matrix multiplication on the third relation mapping matrix, the first zero-space matrix, and the second zero-space matrix, $a_d^{Waist}$ represents the expected angular acceleration of the waist, and $\dot{J}^{Waist}$ represents the derivative of the third relationship mapping matrix.

Therefore, to achieve a real balance control effect of the humanoid robot 10, it must simultaneously meet the expected effects of the above-mentioned three levels of sub-control tasks, that is, simultaneously meet the needs of sole control, the centroid control, and the waist control. For this reason, it must be required that the above-mentioned $\xi_1$ is a specific vector and $\xi_2$ is also a specific vector, so as to ensure that the obtained angular acceleration $\ddot{q}$ of each joint is the expected angular acceleration of each joint that can achieve the eventual balance effect. At this time, $\xi_1$ can be used to indicate a first influence parameter of the humanoid robot 10 that is for eliminating a control interference of the centroid control demand to the sole control demand in the null space corresponding to the first null space matrix, $\xi_2$ can be used to indicate a second influence parameter of the humanoid robot 10 that is for eliminating a control interference of a waist control demand to a sole control demand and a centroid control demand in the null space corresponding to the second null space matrix. The humanoid robot 10 can calculate the above-mentioned two influencing parameters and then substitute them into the equation for calculating the angular acceleration of each joint so as to calculate the currently matched expected angular acceleration of each joint.

Figure 8:
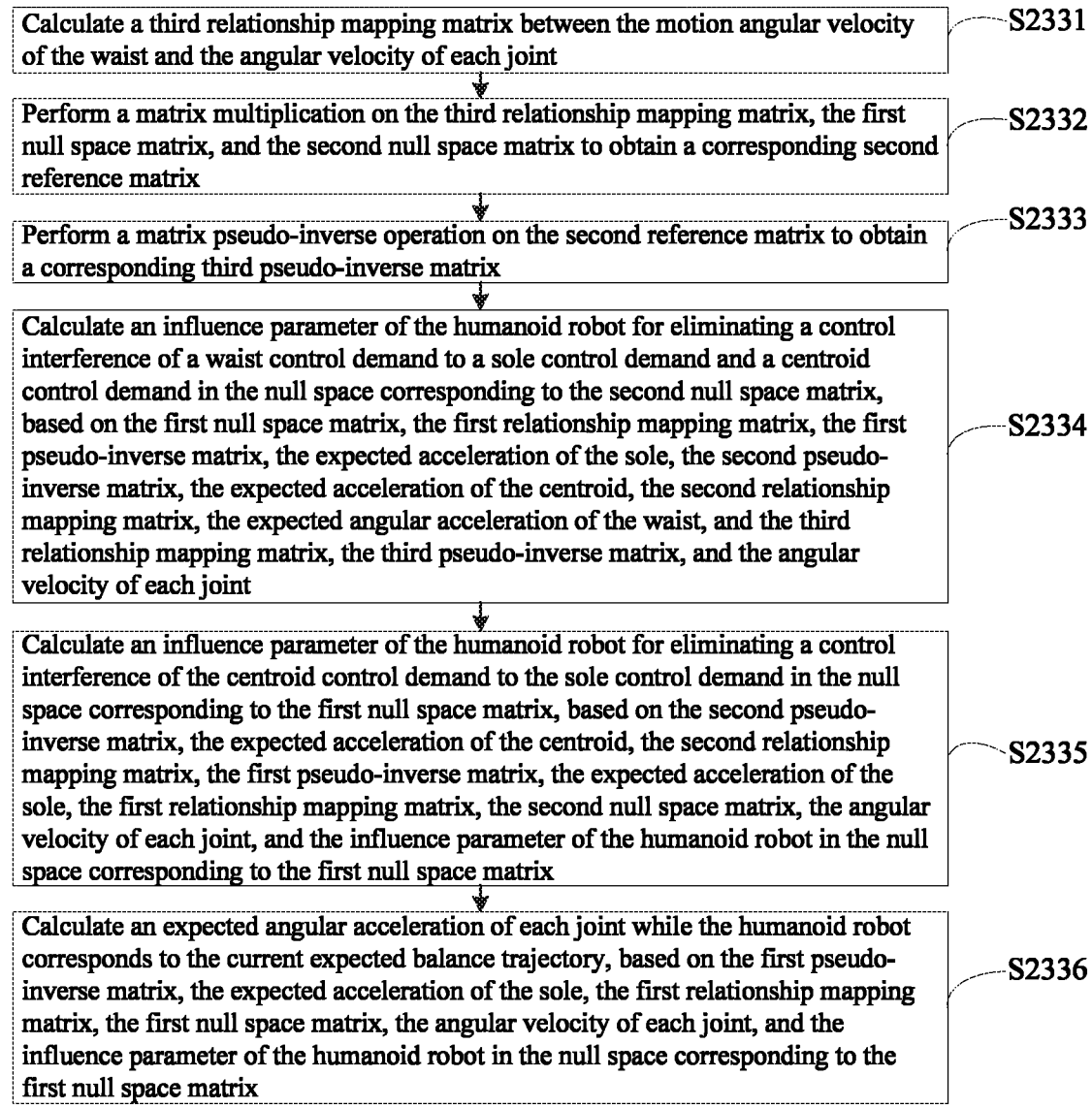
FIG. 8 is a flow chart of an example of sub-steps in step S233 of the method of FIG. 5.

FIG. 8 is a flow chart of an example of sub-steps in step S233 of the method of FIG. 5. As shown in FIG. 8, step S233 may include sub-steps S23331, S23332, S23333, S23334, S23335, and S23336.

S23331: calculating a third relationship mapping matrix between the motion angular velocity of the waist and the angular velocity of each joint.

S23332: performing a matrix multiplication on the third relationship mapping matrix, the first null space matrix, and the second null space matrix to obtain a corresponding second reference matrix.

S23333: performing a matrix pseudo-inverse operation on the second reference matrix to obtain a corresponding third pseudo-inverse matrix.

S23334: calculating a second influence parameter of the humanoid robot for eliminating a control interference of a waist control demand to a sole control demand and a centroid control demand in the null space corresponding to the second null space matrix, based on the first null space matrix, the first relationship mapping matrix, the first pseudo-inverse matrix, the expected acceleration of the sole, the second pseudo-inverse matrix, the expected acceleration of the centroid, the second relationship mapping matrix, the expected angular acceleration of the waist, and the third relationship mapping matrix, the third pseudo-inverse matrix, and the angular velocity of each joint.

S23335: calculating a first influence parameter of the humanoid robot for eliminating a control interference of the centroid control demand to the sole control demand in the null space corresponding to the first null space matrix, based on the second pseudo-inverse matrix, the expected acceleration of the centroid, the second relationship mapping matrix, the first pseudo-inverse matrix, the expected acceleration of the sole, the first relationship mapping matrix, the second null space matrix, the angular velocity of each joint, and the second influence parameter of the humanoid robot in the null space corresponding to the second null space matrix.

S23336: calculating an expected angular acceleration of each joint while the humanoid robot corresponds to the current expected balance trajectory, based on the first pseudo-inverse matrix, the expected acceleration of the sole, the first relationship mapping matrix, the first null space matrix, the angular velocity of each joint, and the first influence parameter of the humanoid robot in the null space corresponding to the first null space matrix.

In this embodiment, the mapping relationship between the angular acceleration of the waist and the angular velocity of each joint can be expressed through an equation of:

$$v^{Waist} = J^{Waist} \dot{q};$$

where, $v^{Waist}$ is a matrix of the motion angular velocity of the waist in the world coordinate system, $\dot{q}$ is a matrix of the angular velocity of each joint, and $J^{Waist}$ represents the third relationship mapping matrix. The third relationship mapping matrix is a Jacobian matrix.

The formula for calculating the third pseudo-inverse matrix can be expressed as:

$$(J^{Waist}N_1N_2)^+ = (J^{Waist}N_1N_2)^T(J^{Waist}N_1N_2(J^{Waist}N_1N_2)^T)^{-1};$$

where, $J^{Waist}N_1N_2$ represents the second reference matrix, and $(J^{Waist}N_1N_2)^+$ represents the third pseudo-inverse matrix.

The second influence parameter of the humanoid robot 10 in the null space corresponding to the second null space matrix, the first influence parameter of the humanoid robot 10 in the null space corresponding to the first null space matrix, and the expected angular acceleration of each joint of the humanoid robot 10 are respectively calculated through an equation of:

$$\xi_2 = (J^{Waist}N_1N_2)^+[a_d^{Waist} - \dot{J}^{Waist}\dot{q} - J^{Waist}(J^{Foot})^+ \\ (a_d^{Foot} - \dot{J}^{Foot}\dot{q}) - J^{Waist}N_1(J^{COM}N_1)^+(a_d^{COM} - \\ \dot{J}^{COM}\dot{q} - J^{COM}(J^{Foot})^+(a_d^{Foot} - \dot{J}^{Foot}\dot{q}))];$$

$$\xi_1 = (J^{COM}N_1)^+(a_d^{COM} - \dot{J}^{COM}\dot{q} - J^{COM}(J^{Foot})^+(a_d^{Foot} - \dot{J}^{Foot}\dot{q})) + N_2\xi_2; \text{ and}$$

$$\ddot{q} = (J^{Foot})^+(a_d^{Foot} - \dot{J}^{Foot}\dot{q}) + N_1\xi_1;$$

where, $\xi_2$ is the second influence parameter of the humanoid robot 10 in the null space corresponding to the second null space matrix, $\xi_1$ is the first influence parameter of the humanoid robot 10 in the null space corresponding to the first null space matrix, $\ddot{q}$ is a matrix of the expected angular acceleration of each joint, $J^{Foot}$ is the first relationship mapping matrix, $(J^{Foot})^+$ is the first pseudo-inverse matrix, $a_d^{Foot}$ is the expected acceleration of the sole, $\dot{J}^{Foot}$ is the derivative of the first relationship mapping matrix, $\dot{q}$ is a matrix of the angular velocity of each joint, $N_1$ is the first null space matrix, $J^{COM}$ is the second relationship mapping matrix, $(J^{COM}N_1)^+$ is the second pseudo-inverse matrix, $a_d^{COM}$ is the expected acceleration of the centroid, $\dot{J}^{COM}$ is the derivative of the second relationship mapping matrix, $N_2$ is the second null space matrix, $J^{Waist}$ is the third relationship mapping matrix, $(J^{Waist}N_1N_2)^+$ is the third pseudo-inverse matrix, $a_d^{Waist}$ is the expected angular acceleration of the waist, and $\dot{J}^{Waist}$ is the derivative of the third relationship mapping matrix.

S240: controlling each joint of the humanoid robot to move at the obtained expected angular acceleration of the joint based on the angular displacement of the joint, so that the humanoid robot maintains balance according to the current expected balance trajectory.

In this embodiment, after the humanoid robot 10 determines the expected angular acceleration of each joint that can simultaneously meet the needs of the sole control, the centroid control, and the waist control, it can integrate the expected angular acceleration of each joint to obtain the corresponding content of the expected angular velocity of each joint, then integrate the matched expected angular velocity of the joint on the basis of the obtained angular displacement of the joint to obtain the expected angular displacement of the joint that can directly control the joint through instructions. At this time, the humanoid robot 10 will extract the expected angular displacement corresponding to each real joint from the calculated expected angular displacement of the joint (including the expected angular displacement corresponding to each real joint and the expected angular displacement corresponding to each virtual joint), and send the extracted expected angular displacement of each real joint to the driving motor of the corresponding real joint, so that the humanoid robot 10 controls each corresponding real joint to move according to the expected angular displacement of the real joint so as to ensure the humanoid robot 10 realizes the eventual balance effect by adjusting the motion state of each real joint that simultaneously affects the effect of the balance control of each part (including the sole, the centroid, and the waist), thereby avoiding the control interferences between the sole control, the centroid control, and the waist control during the balance control, and at the same time meet the control needs of the humanoid robot 10 at the sole, the centroid and the waist so as to reduce the difficulty of balance control. In which, the above-mentioned integration can adopt bilinear transformation, forward difference, backward difference, and the like.

In this embodiment, in order to ensure that the balance control apparatus 100 included in the humanoid robot 10 can be implemented normally, its functions are implemented by dividing the balance control apparatus 100 into functional modules. The compositions of the balance control apparatus 100 will be described below.

Figure 9:
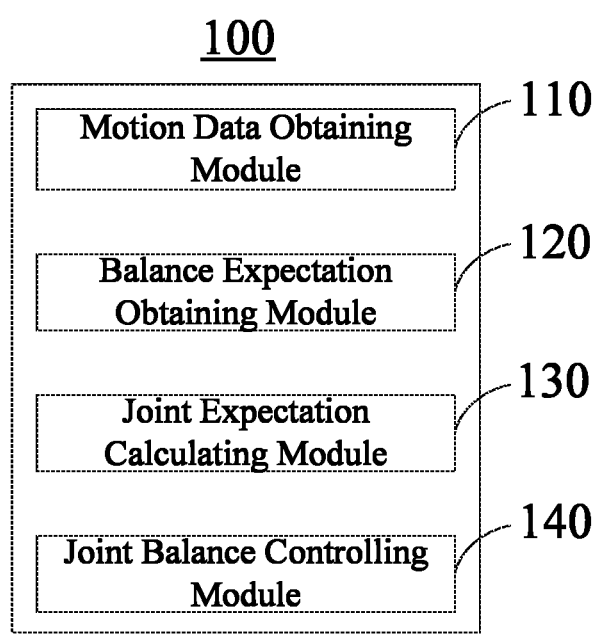
FIG. 9 is a schematic block diagram of a balance control apparatus according to an embodiment of the present disclosure.

FIG. 9 is a schematic block diagram of a balance control apparatus according to an embodiment of the present disclosure. As shown in FIG. 9, in this embodiment, a balance control apparatus 100 for the humanoid robot 10 is provided. The balance control apparatus 100 includes a motion data obtaining module 110, a balance expectation obtaining module 120, a joint expectation calculating module 130, and a joint balance controlling module 140. In other embodiments, the balance control apparatus 100 can be the humanoid robot 10 itself.

The motion data obtaining module 110 is configured to obtain an angular velocity and angular displacement of each joint of the humanoid robot and motion data of a sole of the humanoid robot, motion data of a centroid of the humanoid robot, and motion data of a waist of the humanoid robot.

The balance expectation obtaining module 120 is configured to obtain an expected acceleration of the sole corresponding to a current expected balance trajectory, an expected acceleration of the centroid corresponding to the current expected balance trajectory, and an expected angular acceleration of the waist corresponding to the current expected balance trajectory, based on the motion data of the sole, the motion data of the centroid, and the motion data of the waist, respectively.

The joint expectation calculating module 130 is configured to calculate an expected angular acceleration of each joint meeting a control requirement of the sole, a control requirement of the centroid, and a control requirement of the waist while the humanoid robot corresponds to the current expected balance trajectory, based on the angular velocity of the joint, the expected angular acceleration of the waist, the expected acceleration of the sole, and the expected acceleration of the centroid.

The joint balance controlling module 140 is configured to control each joint of the humanoid robot to move at the obtained expected angular acceleration of the joint based on the angular displacement of the joint, so that the humanoid robot maintains balance according to the current expected balance trajectory.

It should be noted that, the basic principles and technical effects of the balance control apparatus 100 are the same as the above-mentioned balance control method. For a brief description, for the parts not mentioned in this embodiment, please refer to the forgoing description of the balance control method.

In the embodiments of the present disclosure, it should be noted that the disclosed apparatus (device) and method may also be implemented in other manners. The apparatus embodiment described above is merely illustrative. For example, the flowcharts and block diagrams in the drawings show the architectures, functions, and operations possible to implement on the apparatus, methods, and computer program products according to the embodiments of the present disclosure. In this regard, each block in the flowchart or block diagram may represent a part of a module, a program segment, or codes, where the part of the module, the program segment, or the codes contain one or more executable instructions for realizing the specified logic function. It should also be noted that, in some alternative implementations, the functions marked in the block may also occur in a different order from the order marked in the drawings. For example, two consecutive blocks can actually be executed in parallel, or they can sometimes be executed in the reverse order, which depends on the functions involved. It should also be noted that, each block in the block diagram and/or flowchart, and the combination of the blocks in the block diagram and/or flowchart, can be implemented by a dedicated hardware-based system that performs the specified functions or actions, or can be implemented through a combination of dedicated hardware and computer instructions.

In addition, the functional modules in the various embodiments of the present disclosure may be integrated together to form an independent part, or each module may exist alone, or two or more modules may be integrated to form an independent part.

The functions (e.g., the balance control method of FIG. 2) can be stored in a non-transitory computer readable storage medium if it is implemented in the form of a software functional module and sold or utilized as a separate product. Based on this understanding, the technical solution of the present disclosure, either essentially or in part, contributes to the prior art, or a part of the technical solution can be embodied in the form of a software product. The software product is stored in a storage medium (e.g., the storage 11 of the humanoid robot 10 of FIG. 1), which includes a number of instructions for enabling a computer device (which can be a personal computer, a server, a network device, etc.) to execute all or a part of the steps of the methods described in each of the embodiments of the present disclosure. The above-mentioned storage medium includes a variety of media such as a USB disk, a mobile hard disk, a read-only memory (ROM), a random access memory (RAM), a magnetic disk, and an optical disk which is capable of storing program codes.

In summary, in the humanoid robot and its balance control method and computer readable storage medium, by obtaining a current angular velocity and angular displacement of each joint of the humanoid robot and motion data of a sole of the humanoid robot, motion data of a centroid of the humanoid robot, and motion data of a waist of the humanoid robot first, and obtaining an expected acceleration of the sole, an expected acceleration of the centroid corresponding to a current expected balance trajectory, and an expected angular acceleration of the waist corresponding to the current expected balance trajectory, based on the obtained motion data of the sole, the motion data of the centroid, and the motion data of the waist, respectively, then calculating an expected angular acceleration of each joint meeting a control requirement of the sole, a control requirement of the centroid, and a control requirement of the waist while the humanoid robot corresponds to the current expected balance trajectory, based on the angular velocity of the joint, the expected angular acceleration of the waist, the expected acceleration of the sole, and the expected acceleration of the centroid, and then controlling each joint of the humanoid robot to move at the obtained expected angular acceleration of the joint based on the angular displacement of the joint, the balance controls at the sole, the centroid, and the waist can be realized simultaneously by adjusting the motion state of the real joints, thereby avoiding the control interferences between the sole, the centroid, and the waist and reducing the difficulty of balance control.

The forgoing is only the various embodiment of the present disclosure, while the scope of the present disclosure is not limited thereto. For those skilled in the art, various modifications or replacements that can be easily conceived within the technical scope of the present disclosure should be included within the scope of the present disclosure. Therefore, the scope of the present disclosure should be determined in accordance with the scope of the claims.

What is claimed is:

1. A computer-implemented balance control method for a humanoid robot, comprising steps of:
   obtaining an angular velocity and angular displacement of each joint of the humanoid robot and motion data of a sole of the humanoid robot, motion data of a centroid of the humanoid robot, and motion data of a waist of the humanoid robot;
   obtaining an expected acceleration of the sole corresponding to a current expected balance trajectory, an expected acceleration of the centroid corresponding to the current expected balance trajectory, and an expected angular acceleration of the waist corresponding to the current expected balance trajectory, based on the motion data of the sole, the motion data of the centroid, and the motion data of the waist, respectively;
   calculating an expected angular acceleration of each joint meeting a control requirement of the sole, a control requirement of the centroid, and a control requirement of the waist while the humanoid robot corresponds to the current expected balance trajectory, based on the angular velocity of the joint, the expected angular acceleration of the waist, the expected acceleration of the sole, and the expected acceleration of the centroid; and controlling each joint of the humanoid robot to move at the obtained expected angular acceleration of the joint based on the angular displacement of the joint, so that the humanoid robot maintains balance according to the current expected balance trajectory;

wherein the expected balance trajectory comprises a preset balance trajectory corresponding to two balance control parts comprising the sole and the centroid; wherein the preset balance trajectory comprises a reference acceleration, a reference pose, and a reference velocity of the corresponding balance control part; wherein the motion data of the sole comprises a motion speed and a motion pose of the sole, and the motion data of the centroid comprises a motion pose and a motion speed of the centroid, and the step of obtaining the expected acceleration of the sole and the expected acceleration of the centroid corresponding to the current expected balance trajectory, based on the motion data of the sole and the motion data of the centroid, respectively comprises:

for each balance control part corresponding to the sole and the centroid, subtracting the reference pose and the motion pose of the balance control part and subtracting the reference speed and the motion speed of the balance control part to obtain a corresponding pose difference and speed difference;

selecting a difference parameter matching a preset control function corresponding to the balance control part from the obtained pose difference and speed difference; and substituting the reference acceleration of the balance control part and the selected difference parameter into the corresponding preset control function to obtain the expected acceleration of the balance control part;

wherein the expected balance trajectory further comprises a preset balance trajectory of the waist wherein the preset balance trajectory of the waist comprises a reference angular acceleration, a reference posture angle, and a reference angular velocity of the waist, and the motion data of the waist comprises a motion posture angle and a motion angular velocity of the waist, and the step of obtaining the expected angular acceleration of the waist corresponding to the current expected balance trajectory, based on the motion data of the waist comprises:

subtracting the reference posture angle and the motion posture angle of the waist and subtracting the reference angular velocity and the motion angular velocity of the waist to obtain a corresponding posture angle difference and angular velocity difference;

selecting a difference angle parameter matching a preset control function corresponding to the waist from the posture angle difference and the angular velocity difference; and substituting the reference angular acceleration of the waist and the selected difference angle parameter into the corresponding preset control function to obtain the expected angular acceleration of the waist; and wherein the calculating the expected angular acceleration of each joint meeting the control requirement of the sole, the control requirement of the centroid, and the control requirement of the waist while the humanoid robot corresponds to the current expected balance trajectory, based on the angular velocity of the joint, the expected angular acceleration of the waist, the expected acceleration of the sole, and the expected acceleration of the centroid comprises:

calculating a first null space matrix for the sole, based on the angular velocity of each joint and the motion speed of the sole;

calculating a second null space matrix for the sole and the centroid, based on the angular velocity of each joint, the first null space matrix and the motion speed of the centroid; and calculating the angular acceleration of each joint meeting the null space corresponding to the first null space matrix and the null space corresponding to the second null space matrix while the humanoid robot corresponds to the current expected balance trajectory to obtain the corresponding expected angular acceleration of the joint based on the angular velocity of the joint, the first null space matrix, the second null space matrix, the expected angular acceleration of the waist, the expected acceleration of the sole, and the expected acceleration of the centroid.

2. The method of claim 1, wherein the calculating the first null space matrix for the sole, based on the angular velocity of each joint and the motion speed of the sole comprises:

calculating a first relationship mapping matrix between the motion speed of the sole and the angular velocity of each joint;

perform a matrix pseudo-inverse operation on the first relationship mapping matrix to obtain a corresponding first pseudo-inverse matrix; and performing a matrix subtraction operation on an identity matrix and a matrix obtained by multiplying the first relationship mapping matrix and the first pseudo-inverse matrix to obtain the corresponding first null space matrix.

3. The method of claim 2, wherein the calculating the second null space matrix for the sole and the centroid, based on the angular velocity of each joint, the first null space matrix and the motion speed of the centroid comprises:

calculating a second relationship mapping matrix between the motion speed of the centroid and the angular velocity of each joint;

performing a matrix multiplication on the second relationship mapping matrix and the first null space matrix to obtain a corresponding first reference matrix;

performing a matrix pseudo-inverse operation on the first reference matrix to obtain a corresponding second pseudo-inverse matrix; and performing a matrix subtraction on an identity matrix and a matrix obtained by multiplying the first reference matrix and the second pseudo-inverse matrix to obtain the corresponding second null space matrix.

4. The method of claim 3, wherein the calculating the angular acceleration of each joint meeting the null space corresponding to the first null space matrix and the null space corresponding to the second null space matrix while the humanoid robot corresponds to the current expected balance trajectory to obtain the corresponding expected angular acceleration of the joint based on the angular velocity of the joint, the first null space matrix, the second null space matrix, the expected angular acceleration of the waist, the expected acceleration of the sole, and the expected acceleration of the centroid comprises:

calculating a third relationship mapping matrix between the motion angular velocity of the waist and the angular velocity of each joint;

performing a matrix multiplication on the third relationship mapping matrix, the first null space matrix, and the second null space matrix to obtain a corresponding second reference matrix;

performing a matrix pseudo-inverse operation on the second reference matrix to obtain a corresponding third pseudo-inverse matrix;

calculating a second influence parameter of the humanoid robot for eliminating a control interference of a waist control demand to a sole control demand and a centroid control demand in the null space corresponding to the second null space matrix, based on the first null space matrix, the first relationship mapping matrix, the first pseudo-inverse matrix, the expected acceleration of the sole, the second pseudo-inverse matrix, the expected acceleration of the centroid, the second relationship mapping matrix, the expected angular acceleration of the waist, and the third relationship mapping matrix, the third pseudo-inverse matrix, and the angular velocity of each joint;

calculating a first influence parameter of the humanoid robot for eliminating a control interference of the centroid control demand to the sole control demand in the null space corresponding to the first null space matrix, based on the second pseudo-inverse matrix, the expected acceleration of the centroid, the second relationship mapping matrix, the first pseudo-inverse matrix, the expected acceleration of the sole, the first relationship mapping matrix, the second null space matrix, the angular velocity of each joint, and the second influence parameter of the humanoid robot in the null space corresponding to the second null space matrix; and calculating an expected angular acceleration of each joint while the humanoid robot corresponds to the current expected balance trajectory, based on the first pseudo-inverse matrix, the expected acceleration of the sole, the first relationship mapping matrix, the first null space matrix, the angular velocity of each joint, and the first influence parameter of the humanoid robot in the null space corresponding to the first null space matrix.

5. The method of claim 4, wherein the second influence parameter of the humanoid robot in the null space corresponding to the second null space matrix is calculated through an equation of:

$$\xi_2 = (J^{Waist} N_1 N_2)^+ [a_d^{Waist} - \dot{J}^{Waist} \dot{q} - J^{Waist} ((J^{Foot})^+ (a_d^{Foot} - \dot{J}^{Foot} \dot{q}) - J^{Waist} N_1 (J^{COM} N_1)^+ (a_d^{COM} - \dot{J}^{COM} \dot{q} - J^{COM} ((J^{Foot})^+ (a_d^{Foot} - \dot{J}^{Foot} \dot{q})))];$$

the first influence parameter of the humanoid robot in the null space corresponding to the first null space matrix is calculated through an equation of:

$$\xi_1 = (J^{COM} N_1)^+ (a_d^{COM} - \dot{J}^{COM} \dot{q} - J^{COM} (J^{Foot})^+ (a_d^{Foot} - \dot{J}^{Foot} \dot{q})) + N_2 \xi_2; \text{ and}$$

the expected angular acceleration of each joint of the humanoid robot is calculated through an equation of:

$$\ddot{q} = (J^{Foot})^+ (a_d^{Foot} - \dot{J}^{Foot} \dot{q}) + N_1 \xi_1;$$

where, $\xi_2$ is the second influence parameter of the humanoid robot in the null space corresponding to the second null space matrix, $\xi_1$ is the first influence parameter of the humanoid robot in the null space corresponding to the first null space matrix, $\ddot{q}$ is a matrix of the expected angular acceleration of each joint, $J^{Foot}$ is the first relationship mapping matrix, $(J^{Foot})^+$ is the first pseudo-inverse matrix, $a_d^{Foot}$ is the expected acceleration of the sole, $\dot{J}^{Foot}$ is the derivative of the first relationship mapping matrix, $\dot{q}$ is a matrix of the angular velocity of each joint, $N_1$ is the first null space matrix, $J^{COM}$ is the second relationship mapping matrix, $(J^{COM} N_1)^+$ is the second pseudo-inverse matrix, $a_d^{COM}$ is the expected acceleration of the centroid, $\dot{J}^{COM}$ is the derivative of the second relationship mapping matrix, $N_2$ is the second null space matrix, $J^{Waist}$ is the third relationship mapping matrix, $(J^{Waist} N_1 N_2)^+$ is the third pseudo-inverse matrix, $a_d^{Waist}$ is the expected angular acceleration of the waist, and $\dot{J}^{Waist}$ is the derivative of the third relationship mapping matrix.

6. The method of claim 1, wherein the angular velocity and the angular displacement of each joint of the humanoid robot and the motion data of the sole of the humanoid robot, the motion data of the centroid of the humanoid robot, and the motion data of the waist of the humanoid robot are obtained by monitoring the angular velocity and the angular displacement of each joint of the humanoid robot, and collecting the motion data of the sole of the humanoid robot, the motion data of the centroid of the humanoid robot, and the motion data of the waist of the humanoid robot in real time through a sensing unit of the humanoid robot.

7. The method of claim 1, wherein control algorithms used by preset control functions corresponding to different balance control parts are same or different.

8. The method of claim 7, wherein the preset control function corresponding to the balance control part further comprises a preset control function for the centroid of the humanoid robot, and wherein the preset control function for the centroid of the humanoid robot uses any one of the PID control algorithm, the PI control algorithm, the PD control algorithm and the P control algorithm.

9. The method of claim 1, wherein the preset control function corresponding to the balance control part comprises a preset control function for the sole of the humanoid robot, and wherein the preset control function for the sole of the humanoid robot uses any one of PID control algorithm, PI control algorithm, PD control algorithm and P control algorithm.

10. The method of claim 1, wherein the preset control function corresponding to the waist uses any one of PID control algorithm, PI control algorithm, PD control algorithm, and P control algorithm.

11. A humanoid robot, comprising:
a processor;
a memory coupled to the processor; and
one or more computer programs stored in the memory and executable on the processor;
wherein, the one or more computer programs comprise:
instructions for obtaining an angular velocity and angular displacement of each joint of the humanoid robot and motion data of a sole of the humanoid robot, motion data of a centroid of the humanoid robot, and motion data of a waist of the humanoid robot;
instructions for obtaining an expected acceleration of the sole corresponding to a current expected balance trajectory, an expected acceleration of the centroid corresponding to the current expected balance trajectory, and an expected angular acceleration of the waist corresponding to the current expected balance trajectory, based on the motion data of the sole, the motion data of the centroid, and the motion data of the waist, respectively;
instructions for calculating an expected angular acceleration of each joint meeting a control requirement of the sole, a control requirement of the centroid, and a control requirement of the waist while the humanoid robot corresponds to the current expected balance trajectory, based on the angular velocity of the joint, the expected angular acceleration of the waist, the expected acceleration of the sole, and the expected acceleration of the centroid; and instructions for controlling each joint of the humanoid robot to move at the obtained expected angular acceleration of the joint based on the angular displacement of the joint, so that the humanoid robot maintains balance according to the current expected balance trajectory;

wherein the expected balance trajectory comprises a preset balance trajectory corresponding to two balance control parts comprising the sole and the centroid; wherein the preset balance trajectory comprises a reference acceleration, a reference pose, and a reference velocity of the corresponding balance control part; wherein the motion data of the sole comprises a motion speed and a motion pose of the sole, and the motion data of the centroid comprises a motion pose and a motion speed of the centroid, and the instructions for obtaining the expected acceleration of the sole and the expected acceleration of the centroid corresponding to the current expected balance trajectory, based on the motion data of the sole and the motion data of the centroid, respectively comprise:

instructions for each balance control part corresponding to the sole and the centroid, subtracting the reference pose and the motion pose of the balance control part and subtracting the reference speed and the motion speed of the balance control part to obtain a corresponding pose difference and speed difference;

instructions for selecting a difference parameter matching a preset control function corresponding to the balance control part from the obtained pose difference and speed difference; and instructions for substituting the reference acceleration of the balance control part and the selected difference parameter into the corresponding preset control function to obtain the expected acceleration of the balance control part;

wherein the expected balance trajectory further comprises a preset balance trajectory of the waist wherein the preset balance trajectory of the waist comprises a reference angular acceleration, a reference posture angle, and a reference angular velocity of the waist, and the motion data of the waist comprises a motion posture angle and a motion angular velocity of the waist, and the instructions for obtaining the expected angular acceleration of the waist corresponding to the current expected balance trajectory, based on the motion data of the waist comprise:

instructions for subtracting the reference posture angle and the motion posture angle of the waist and subtracting the reference angular velocity and the motion angular velocity of the waist to obtain a corresponding posture angle difference and angular velocity difference;

instructions for selecting a difference angle parameter matching a preset control function corresponding to the waist from the posture angle difference and the angular velocity difference; and instructions for substituting the reference angular acceleration of the waist and the selected difference angle parameter into the corresponding preset control function to obtain the expected angular acceleration of the waist; and wherein the instructions for calculating the expected angular acceleration of each joint meeting the control requirement of the sole, the control requirement of the centroid, and the control requirement of the waist while the humanoid robot corresponds to the current expected balance trajectory, based on the angular velocity of the joint, the expected angular acceleration of the waist, the expected acceleration of the sole, and the expected acceleration of the centroid comprise:

instructions for calculating a first null space matrix for the sole, based on the angular velocity of each joint and the motion speed of the sole;

instructions for calculating a second null space matrix for the sole and the centroid, based on the angular velocity of each joint, the first null space matrix and the motion speed of the centroid; and instructions for calculating the angular acceleration of each joint meeting the null space corresponding to the first null space matrix and the null space corresponding to the second null space matrix while the humanoid robot corresponds to the current expected balance trajectory to obtain the corresponding expected angular acceleration of the joint based on the angular velocity of the joint, the first null space matrix, the second null space matrix, the expected angular acceleration of the waist, the expected acceleration of the sole, and the expected acceleration of the centroid.

12. The robot of claim 11, wherein the instructions for calculating the first null space matrix for the sole, based on the angular velocity of each joint and the motion speed of the sole comprise: instructions for calculating a first relationship mapping matrix between the motion speed of the sole and the angular velocity of each joint; instructions for performing a matrix pseudo-inverse operation on the first relationship mapping matrix to obtain a corresponding first pseudo-inverse matrix; and instructions for performing a matrix subtraction operation on an identity matrix and a matrix obtained by multiplying the first relationship mapping matrix and the first pseudo-inverse matrix to obtain the corresponding first null space matrix.

13. The robot of claim 12, wherein the instructions for calculating the second null space matrix for the sole and the centroid, based on the angular velocity of each joint, the first null space matrix and the motion speed of the centroid comprise:

instructions for calculating a second relationship mapping matrix between the motion speed of the centroid and the angular velocity of each joint;

instructions for performing a matrix multiplication on the second relationship mapping matrix and the first null space matrix to obtain a corresponding first reference matrix;

instructions for performing a matrix pseudo-inverse operation on the first reference matrix to obtain a corresponding second pseudo-inverse matrix; and instructions for performing a matrix subtraction on an identity matrix and a matrix obtained by multiplying the first reference matrix and the second pseudo-inverse matrix to obtain the corresponding second null space matrix.

14. The robot of claim 13, wherein the instructions for calculating the angular acceleration of each joint meeting the null space corresponding to the first null space matrix and the null space corresponding to the second null space matrix while the humanoid robot corresponds to the current expected balance trajectory to obtain the corresponding expected angular acceleration of the joint based on the angular velocity of the joint, the first null space matrix, the second null space matrix, the expected angular acceleration of the waist, the expected acceleration of the sole, and the expected acceleration of the centroid comprises:
- instructions for calculating a third relationship mapping matrix between the motion angular velocity of the waist and the angular velocity of each joint;
- instructions for performing a matrix multiplication on the third relationship mapping matrix, the first null space matrix, and the second null space matrix to obtain a corresponding second reference matrix;
- instructions for performing a matrix pseudo-inverse operation on the second reference matrix to obtain a corresponding third pseudo-inverse matrix;
- instructions for calculating a second influence parameter of the humanoid robot for eliminating a control interference of a waist control demand to a sole control demand and a centroid control demand in the null space corresponding to the second null space matrix, based on the first null space matrix, the first relationship mapping matrix, the first pseudo-inverse matrix, the expected acceleration of the sole, the second pseudo-inverse matrix, the expected acceleration of the centroid, the second relationship mapping matrix, the expected angular acceleration of the waist, and the third relationship mapping matrix, the third pseudo-inverse matrix, and the angular velocity of each joint;
- instructions for calculating a first influence parameter of the humanoid robot for eliminating a control interference of the centroid control demand to the sole control demand in the null space corresponding to the first null space matrix, based on the second pseudo-inverse matrix, the expected acceleration of the centroid, the second relationship mapping matrix, the first pseudo-inverse matrix, the expected acceleration of the sole, the first relationship mapping matrix, the second null space matrix, the angular velocity of each joint, and the second influence parameter of the humanoid robot in the null space corresponding to the second null space matrix; and
- instructions for calculating an expected angular acceleration of each joint while the humanoid robot corresponds to the current expected balance trajectory, based on the first pseudo-inverse matrix, the expected acceleration of the sole, the first relationship mapping matrix, the first null space matrix, the angular velocity of each joint, and the first influence parameter of the humanoid robot in the null space corresponding to the first null space matrix.

15. The robot of claim 14, wherein the second influence parameter of the humanoid robot in the null space corresponding to the second null space matrix is calculated through an equation of:

$$\xi_2 = (J^{Waist}N_1N_2)^+[a_d^{Waist} - \dot{J}^{Waist}\dot{q} - J^{Waist}(J^{Foot})^+ \\ (a_d^{Foot} - \dot{J}^{Foot}\dot{q}) - J^{Waist}N_1(J^{COM}N_1)^+(a_d^{COM} - \\ \dot{J}^{COM}\dot{q} - J^{COM}(J^{Foot})^+(a_d^{Foot} - \dot{J}^{Foot}\dot{q}))];$$

the first influence parameter of the humanoid robot in the null space corresponding to the first null space matrix is calculated through an equation of:

$$\xi_1 = (J^{COM}N_1)^+(a_d^{COM} - \dot{J}^{COM}\dot{q} - J^{COM}(J^{Foot})^+(a_d^{Foot} - \dot{J}^{Foot}\dot{q})) + N_2\xi_2; \text{ and}$$

the expected angular acceleration of each joint of the humanoid robot is calculated through an equation of:

$$\ddot{q} = (J^{Foot})^+(a_d^{Foot} - \dot{J}^{Foot}\dot{q}) + N_1\xi_1;$$

where, $\xi_2$ is the second influence parameter of the humanoid robot in the null space corresponding to the second null space matrix, $\xi_1$ is the first influence parameter of the humanoid robot in the null space corresponding to the first null space matrix, $\ddot{q}$ is a matrix of the expected angular acceleration of each joint, $J^{Foot}$ is the first relationship mapping matrix, $(J^{Foot})^+$ is the first pseudo-inverse matrix, $a_d^{Foot}$ is the expected acceleration of the sole, $\dot{J}^{Foot}$ is the derivative of the first relationship mapping matrix, $\dot{q}$ is a matrix of the angular velocity of each joint, $N_1$ is the first null space matrix, $J^{COM}$ is the second relationship mapping matrix, $(J^{COM}N_1)^+$ is the second pseudo-inverse matrix, $a_d^{COM}$ is the expected acceleration of the centroid, $\dot{J}^{COM}$ is the derivative of the second relationship mapping matrix, $N_2$ is the second null space matrix, $J^{Waist}$ is the third relationship mapping matrix, $(J^{Waist}N_1N_2)^+$ is the third pseudo-inverse matrix, $a_d^{Waist}$ is the expected angular acceleration of the waist, and $\dot{J}^{Waist}$ is the derivative of the third relationship mapping matrix.

16. A non-transitory computer readable storage medium for storing one or more computer programs, wherein the one or more computer programs comprise:
- instructions for obtaining an angular velocity and angular displacement of each joint of the humanoid robot and motion data of a sole of the humanoid robot, motion data of a centroid of the humanoid robot, and motion data of a waist of the humanoid robot;
- instructions for obtaining an expected acceleration of the sole corresponding to a current expected balance trajectory, an expected acceleration of the centroid corresponding to the current expected balance trajectory, and an expected angular acceleration of the waist corresponding to the current expected balance trajectory, based on the motion data of the sole, the motion data of the centroid, and the motion data of the waist, respectively;
- instructions for calculating an expected angular acceleration of each joint meeting a control requirement of the sole, a control requirement of the centroid, and a control requirement of the waist while the humanoid robot corresponds to the current expected balance trajectory, based on the angular velocity of the joint, the expected angular acceleration of the waist, the expected acceleration of the sole, and the expected acceleration of the centroid; and
- instructions for controlling each joint of the humanoid robot to move at the obtained expected angular acceleration of the joint based on the angular displacement of the joint, so that the humanoid robot maintains balance according to the current expected balance trajectory;

wherein the expected balance trajectory comprises a preset balance trajectory corresponding to two balance control parts comprising the sole and the centroid; wherein the preset balance trajectory comprises a reference acceleration, a reference pose, and a reference velocity of the corresponding balance control part; wherein the motion data of the sole comprises a motion speed and a motion pose of the sole, and the motion data of the centroid comprises a motion pose and a motion speed of the centroid, and the instructions for obtaining the expected acceleration of the sole and the expected acceleration of the centroid corresponding to the current expected balance trajectory, based on the motion data of the sole and the motion data of the centroid, respectively comprise:
  instructions for each balance control part corresponding to the sole and the centroid, subtracting the reference pose and the motion pose of the balance control part and subtracting the reference speed and the motion speed of the balance control part to obtain a corresponding pose difference and speed difference;
  instructions for selecting a difference parameter matching a preset control function corresponding to the balance control part from the obtained pose difference and speed difference; and
  instructions for substituting the reference acceleration of the balance control part and the selected difference parameter into the corresponding preset control function to obtain the expected acceleration of the balance control part;
wherein the expected balance trajectory further comprises a preset balance trajectory of the waist wherein the preset balance trajectory of the waist comprises a reference angular acceleration, a reference posture angle, and a reference angular velocity of the waist, and the motion data of the waist comprises a motion posture angle and a motion angular velocity of the waist, and the instructions for obtaining the expected angular acceleration of the waist corresponding to the current expected balance trajectory, based on the motion data of the waist comprise:
  instructions for subtracting the reference posture angle and the motion posture angle of the waist and subtracting the reference angular velocity and the motion angular velocity of the waist to obtain a corresponding posture angle difference and angular velocity difference;
  instructions for selecting a difference angle parameter matching a preset control function corresponding to the waist from the posture angle difference and the angular velocity difference; and
  instructions for substituting the reference angular acceleration of the waist and the selected difference angle parameter into the corresponding preset control function to obtain the expected angular acceleration of the waist; and
wherein the instructions for calculating the expected angular acceleration of each joint meeting the control requirement of the sole, the control requirement of the centroid, and the control requirement of the waist while the humanoid robot corresponds to the current expected balance trajectory, based on the angular velocity of the joint, the expected angular acceleration of the waist, the expected acceleration of the sole, and the expected acceleration of the centroid comprise:
  instructions for calculating a first null space matrix for the sole, based on the angular velocity of each joint and the motion speed of the sole;
  instructions for calculating a second null space matrix for the sole and the centroid, based on the angular velocity of each joint, the first null space matrix and the motion speed of the centroid; and
  instructions for calculating the angular acceleration of each joint meeting the null space corresponding to the first null space matrix and the null space corresponding to the second null space matrix while the humanoid robot corresponds to the current expected balance trajectory to obtain the corresponding expected angular acceleration of the joint based on the angular velocity of the joint, the first null space matrix, the second null space matrix, the expected angular acceleration of the waist, the expected acceleration of the sole, and the expected acceleration of the centroid.

17. The non-transitory computer readable storage medium of claim 16, wherein the instructions for calculating the first null space matrix for the sole, based on the angular velocity of each joint and the motion speed of the sole comprise: instructions for calculating a first relationship mapping matrix between the motion speed of the sole and the angular velocity of each joint; instructions for performing a matrix pseudo-inverse operation on the first relationship mapping matrix to obtain a corresponding first pseudo-inverse matrix; and instructions for performing a matrix subtraction operation on an identity matrix and a matrix obtained by multiplying the first relationship mapping matrix and the first pseudo-inverse matrix to obtain the corresponding first null space matrix.

18. The non-transitory computer readable storage medium of claim 17, wherein the instructions for calculating the second null space matrix for the sole and the centroid, based on the angular velocity of each joint, the first null space matrix and the motion speed of the centroid comprise:
  instructions for calculating a second relationship mapping matrix between the motion speed of the centroid and the angular velocity of each joint;
  instructions for performing a matrix multiplication on the second relationship mapping matrix and the first null space matrix to obtain a corresponding first reference matrix;
  instructions for performing a matrix pseudo-inverse operation on the first reference matrix to obtain a corresponding second pseudo-inverse matrix; and
  instructions for performing a matrix subtraction on an identity matrix and a matrix obtained by multiplying the first reference matrix and the second pseudo-inverse matrix to obtain the corresponding second null space matrix.

19. The non-transitory computer readable storage medium of claim 18, wherein the instructions for calculating the angular acceleration of each joint meeting the null space corresponding to the first null space matrix and the null space corresponding to the second null space matrix while the humanoid robot corresponds to the current expected balance trajectory to obtain the corresponding expected angular acceleration of the joint based on the angular velocity of the joint, the first null space matrix, the second null space matrix, the expected angular acceleration of the waist, the expected acceleration of the sole, and the expected acceleration of the centroid comprises:
  instructions for calculating a third relationship mapping matrix between the motion angular velocity of the waist and the angular velocity of each joint;
  instructions for performing a matrix multiplication on the third relationship mapping matrix, the first null space matrix, and the second null space matrix to obtain a corresponding second reference matrix;
  instructions for performing a matrix pseudo-inverse operation on the second reference matrix to obtain a corresponding third pseudo-inverse matrix;
  instructions for calculating a second influence parameter of the humanoid robot for eliminating a control interference of a waist control demand to a sole control demand and a centroid control demand in the null space corresponding to the second null space matrix, based on the first null space matrix, the first relationship mapping matrix, the first pseudo-inverse matrix, the expected acceleration of the sole, the second pseudo-inverse matrix, the expected acceleration of the centroid, the second relationship mapping matrix, the expected angular acceleration of the waist, and the third relationship mapping matrix, the third pseudo-inverse matrix, and the angular velocity of each joint;

instructions for calculating a first influence parameter of the humanoid robot for eliminating a control interference of the centroid control demand to the sole control demand in the null space corresponding to the first null space matrix, based on the second pseudo-inverse matrix, the expected acceleration of the centroid, the second relationship mapping matrix, the first pseudo-inverse matrix, the expected acceleration of the sole, the first relationship mapping matrix, the second null space matrix, the angular velocity of each joint, and the second influence parameter of the humanoid robot in the null space corresponding to the second null space matrix; and instructions for calculating an expected angular acceleration of each joint while the humanoid robot corresponds to the current expected balance trajectory, based on the first pseudo-inverse matrix, the expected acceleration of the sole, the first relationship mapping matrix, the first null space matrix, the angular velocity of each joint, and the first influence parameter of the humanoid robot in the null space corresponding to the first null space matrix.

20. The non-transitory computer readable storage medium of claim 19, wherein the second influence parameter of the humanoid robot in the null space corresponding to the second null space matrix is calculated through an equation of:

$$\xi_2 = (J^{Waist} N_1 N_2)^+ [a_d^{Waist} - \dot{J}^{Waist}\dot{q} - J^{Waist}(J^{Foot})^+ (a_d^{Foot} - \dot{J}^{Foot}\dot{q}) - J^{Waist} N_1 (J^{COM} N_1)^+ (a_d^{COM} - \dot{J}^{COM}\dot{q} - J^{COM}(J^{Foot})^+ (a_d^{Foot} - \dot{J}^{Foot}\dot{q}))];$$

the first influence parameter of the humanoid robot in the null space corresponding to the first null space matrix is calculated through an equation of:

$$\xi_1 = (J^{COM} N_1)^+ (a_d^{COM} - \dot{J}^{COM}\dot{q} - J^{COM}(J^{Foot})^+ (a_d^{Foot} - \dot{J}^{Foot}\dot{q})) + N_2 \xi_2;$$

the expected angular acceleration of each joint of the humanoid robot is calculated through an equation of:

$$\ddot{q} = (J^{Foot})^+ (a_d^{Foot} - \dot{J}^{Foot}\dot{q}) + N_1 \xi_1;$$

where, $\xi_2$ is the second influence parameter of the humanoid robot in the null space corresponding to the second null space matrix, $\xi_1$ is the first influence parameter of the humanoid robot in the null space corresponding to the first null space matrix, $\ddot{q}$ is a matrix of the expected angular acceleration of each joint, $J^{Foot}$ is the first relationship mapping matrix, $(J^{Foot})^+$ is the first pseudo-inverse matrix, $a_d^{Foot}$ is the expected acceleration of the sole, is the derivative of the first relationship mapping matrix, $\dot{q}$ is a matrix of the angular velocity of each joint, $N_1$ is the first null space matrix, $J^{COM}$ is the second relationship mapping matrix, $(J^{COM} N_1)^+$ is the second pseudo-inverse matrix, is the expected acceleration of the centroid, $\dot{J}^{COM}$ is the derivative of the second relationship mapping matrix, $N_2$ is the second null space matrix $J^{Waist}$ is the third relationship mapping matrix, $(J^{Waist} N_1 N_2)^+$ is the third pseudo-inverse matrix, $a_d^{Waist}$ is the expected angular acceleration of the waist, and $\dot{J}^{Waist}$ is the derivative of the third relationship mapping matrix.

* * * * *